United States Patent Office 2,774,771
Patented Dec. 18, 1956

2,774,771
DIHYDROPYRAN DERIVATIVES

Raymond I. Longley, Jr., Springfield, Mass., assignor to Monsanto Chemical Company, St. Louis, Mo., a corporation of Delaware No Drawing. Application August 11, 1955,
Serial No. 527,869

3 Claims. (Cl. 260—345.8)

The present invention relates to a new class of dihydropyrans and to a process of producing the same.

An object of the invention is the provision of dihydropyrans having both an ether and a carboxylate substituent. Another object of the invention is the provision of an easy method for the preparation of such dihydropyrans from readily available materials. A further object is the provision of a new series of chemical compounds which are useful in the preparation of surface-active agents, therapeutic agents, dye-stuffs, synthetic resins and plastics, fungicides, bacteriostats, insecticides, parasiticides, etc. Other objects will be hereinafter disclosed.

While the prior art has provided various derivatives of dihydropyrans, the preparation of compounds in which the dihydropyran nucleus has attached to its carbons not only a carboxylate, but also an ether group has not been hitherto achieved. Inasmuch as for some specific purposes, e. g., for the preparation of non-ionic surface-active agents, the presence of both an ester group and an ether group in the dihydropyran structure is desirable, the present invention provides a new series of highly valuable chemical compounds.

According to the invention, 3,4-dihydro-1,2-pyrans having an ether and a carboxylate substituent are produced by reaction of certain esters of $\alpha,\beta$-monolefinic, ketonic acids with certain olefinic ethers.

The present dihydropyran derivatives are produced by the addition reaction of the esters with the ethers substantially according to the scheme:

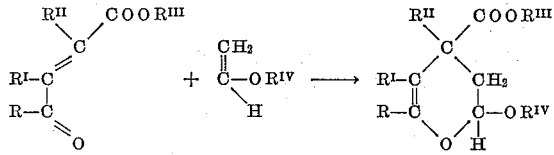

in which $R^I$ and $R^{II}$ are selected from the class consisting of hydrogen and the methyl radical and R, $R^{III}$ and $R^{IV}$ are hydrocarbon radicals which are free of non-benzenoid unsaturation and contain from 1 to 18 carbon atoms.

Olefinic $\beta$-keto-esters useful for the present purpose may be generally represented by the formula

in which R, $R^I$, $R^{II}$ and $R^{III}$ are as defined above. As representative of compounds having this general formula may be mentioned the $\beta$-aroylacrylates such as ethyl, dodecyl, phenyl or 4-ethylphenyl $\beta$-benzoylacrylate or $\beta$-(2-naphthoyl)acrylate; the $\beta$-alcoylacrylates such as methyl, amyl, hexadecyl, phenyl, 4-tolyl or cyclohexyl $\beta$-acetyl-, $\beta$-butyryl- or $\beta$-lauroylacrylate; the $\beta$-alcoyl- or $\beta$-aroylmethacrylates such as methyl or phenyl $\beta$-acetyl- or $\beta$-benzoylmethacrylate; the $\beta$-alcoyl- or $\beta$-aroyltiglates such as isopropyl or cyclopentyl $\beta$-propionyl- or $\beta$-benzoyltiglate; the $\beta$-acylangelicates such as methyl $\beta$-acetylangelicate; the $\beta$-acyldimethylacrylates such as amyl $\beta$-benzoyl-$\alpha,\beta$-dimethylacrylate, etc.

Vinyl ethers which may be reacted with the above ketonic acids to yield the present dihydropyran compounds are ethers having the formula $CH_2:CH.O.R^{IV}$ in which $R^{IV}$ is a hydrocarbon radical which is free of non-benzenoid unsaturation and which contains from 1 to 18 carbon atoms. Examples of suitable vinyl ethers are the alkyl vinyl ethers such as methyl, isobutyl, hexyl, or dodecyl vinyl ethers, the cycloalkyl vinyl ethers such as cyclohexyl or methylcyclopentyl vinyl ether, the aryl vinyl ethers such as phenyl or naphthyl vinyl ether, the alkaryl vinyl ethers such as 4-butylphenyl or xylyl vinyl ether, the aralkyl vinyl ethers such as 2-phenylethyl or $\beta$-naphthylmethyl vinyl ether, etc.

The present invention thus provides a wide series of new dihydropyrans, the derivative obtained being a function of the ether and the acylacrylate employed in the reaction. When $R^I$ and $R^{II}$ in the structural formula given above are hydrogen, and R, $R^{III}$ and $R^{IV}$ are alkyl groups, the products are alkyl 2-alkoxy-6-alkyl-3,4-dihydro-1,2-pyran-4-carboxylates, this class of compounds being obtainable from alkyl vinyl ethers and alkyl $\beta$-alcoyl acrylates. Methyl 2 - ethoxy - 6-methyl-3,4-dihydro-1,2-pyran-4-carboxylate and isobutyl 6-ethyl-2-lauryloxy-3,4-dihydro-1,2-pyran-4-carboxylate are examples of this class.

Another class of compounds comprises the alkyl 2-aryloxy - 6 - alkyl-3,4-dihydro-1,2-pyran - 4 - carboxylates, this class of compounds being obtainable by reaction of an aryl vinyl ether with alkyl $\beta$-alcoylacrylates, e. g., methyl $\beta$-acetylacrylate. When aryl $\beta$-aroylacrylates are employed as the ester components and the ether is an aryl vinyl ether, the products are aryl 2-aryloxy-6-aryl-3,4-dihydro-1,2-pyran-4-carboxylates, e. g., $\beta$-naphthyl 2-(2,4-dichlorophenoxy) - 6 - phenyl-3,4-dihydro - 1,2-pyran - 4-carboxylate.

The presence of substituents in the 4 and 5 positions of the dihydropyran ether-ester is a function of the keto-ester employed, for example, when R and $R^I$ in the above structural formula for the ester component is a methyl group, e. g., as in a crotonate, $R^{II}$ is hydrogen and R and $R^{III}$ are alkyl radicals such as ethyl, and $R^{IV}$ is also an alkyl radical such as ethyl, the product is ethyl 2-ethoxy-5-methyl-6-ethyl-3,4-dihydro-1,2-pyran-4-carboxylate. The aryl, alkyl, aralkyl, alkaryl, and cycloalkyl radicals in the vinyl ethers and $\beta$-ketonic esters may be themselves substituted with such groups as the alkyl, acyl, nitro, alkoxy and cyano group, halogen, etc. Hence, the specific dihydropyran ether-ester obtainable according to the invention is limited only by the available vinyl ether and the mono-olefinic, ketonic ester.

Addition of the vinyl ether with the ketonic ester to form the present compounds is effected by heating the ether with the $\beta$-acyl-$\alpha,\beta$-mono-olefinic ester. While any elevated temperature may be employed, the addition reaction is best conducted at, say, temperatures of 100° C. to 250° C., and for a period of from 1 to 50 hours. The desired dihydropyran derivative is then recovered from the reaction mixture, preferably by fractional distillation. The pressure conditions employed may be widely varied, depending upon the nature of the reactants used. When working with readily voltilizable materials, it is preferred to operate in a sealed container, whereby reaction pressure is built up during the heating time. Extraneous solvents or diluents may be employed but such materials are generally unnecessary.

The present invention is further illustrated, but not limited, by the following examples:

Example 1

A mixture consisting of 40 grams of methyl $\beta$-acetylacrylate and 130 grams of ethyl vinyl ether was heated, with rocking, in a 300 ml. autoclave for 3 hours at a temperature of 200° C. Heating at 194-202° C. for additional 8 hours was then continued, without rocking. Distillation of the resulting light yellow liquid (166 grams) through a Vigreux column gave a 78 percent yield of the substantially pure methyl 2-ethoxy-6-methyl-3,4-dihydro-1,2-pyran-4-carboxylate, B. P. 110–112° C./12 mm., analyzing as follows:

|  | Found | Calculated for $C_{10}H_{16}O_4$ |
| --- | --- | --- |
| Percent C | 59.6 | 60.0 |
| Percent H | 8.0 | 8.0 |

*Example 2*

A mixture consisting of 64 grams of methyl 2-benzoylacrylate and 110 grams of ethyl vinyl ether was heated in a 300 ml. autoclave for 18 hours at a temperature of from 200–210° C. Distillation of the resulting mixture through a Vigreux column gave the substantially pure methyl 2-ethoxy - 6 - phenyl - 3,4 - dihydro - 1,2-pyran-4-carboxylate, B. P. 145° C./1.0 mm., and analyzing as follows:

|  | Found | Calculated for $C_{15}H_{18}O_4$ |
| --- | --- | --- |
| Percent C | 68.8 | 68.7 |
| Percent H | 7.1 | 6.9 |

Operating in like manner but using phenyl vinyl ether instead of ethyl vinyl ether a good yield of methyl 2-phenoxy - 6 - methyl-(or phenyl) -3,4 - dihydro-1,2-pyran - 4 - carboxylate may be obtained.

Hydrolysis of the products with dilute alcoholic alkali may be effected to give the alkali salt or 2-ethoxy- (or phenoxy) -6-methyl (or phenyl) -3,4-dihydro-1,2-pyran-4-carboxylic acid, which may be subsequently converted to the free acid or other salts, e. g., the metal salts by reaction with the appropriate salt-forming reagent. In this manner there are obtainable materials of considerable importance in the dyestuffs, insecticide and fungicides industries such as the sodium, lead and copper salts.

*Example 3*

This example shows the preparation of a bacteriostat from the methyl 2-ethoxy-6-methyl - 3,4 - dihydro-1,4-pyran - 4 - carboxylate of Example 2.

A mixture consisting of 15 grams of said carboxylate, 10 grams of potassium hydroxide and 100 ml. of water was refluxed for 1 hour to effect saponification and 4 ml. of acetic acid was then added to neutralize some excess of base. To the resulting reaction mixture there was added 100 grams (0.1 mole) of a 25 percent aqueous solution of cuprous sulfate ($CuSO_4.5H_2O$). The whole was allowed to stand overnight at room temperature, filtered, the precipitate washed with water and dried. Analysis of the dried product thus obtained showed 26.58% copper, which value corresponds well to the calculated Cu content of copper 2-ethoxy - 6 - methyl-3,4 - dihydro - 1,2 - pyran - 4 - carboxylate.

This copper salt was evaluated as a bacteriostat using the following testing procedure:

A stock solution of the copper salt was prepared by adding 100 mg. of said compound to 10 ml. of a non-toxic solvent therefor. Two ml. of said stock solution was transferred by means of a sterile 5 ml. pipette to a tube containing 18 ml. of sterile, melted nutrient agar to obtain a dilution of 1 part of the copper salt per 1,000 parts of agar. Two ml. of the 1:1000 mixture thus obtained was added to another tube containing 18 ml. of said nutrient agar to obtain a dilution of 1 part of said copper salt per 10,000 parts of agar; the contents of the tubes were respectively poured into sterile Petri dishes and allowed to harden.

A test culture slant of *Micrococcus pyogenes* var. *aureus* was prepared employing a nutrient agar consisting off:

5 g. Liebig's beef extract
    10 g. Armour's peptone
    5 g. sodium chloride
    15 g. Bacto-agar
    Water to make up 1 liter.

The above nutrient agar mixture was adjusted to pH 6.8 and sterilized for 15 minutes at 121° C. in an autoclave. A slant of the nutrient agar was prepared and inoculated with said *M. pyogenes aureus* and the inoculated slant was incubated at 37° C. for 24 hours.

A cell suspension of *M. pyogenes aureus* was prepared by adding 10 ml. of sterile, distilled water to the incubated slant and dislodging the cells therein with a transfer needle. Each of said Petri plates of hardened agar were inoculated by transferring one drop of said cell suspension thereto, and said inoculated plates, as well as similarly inoculated plates of nutrient agar, were incubated at 37° C. for 48 hours. Inspection of the inoculated and incubated plates at the end of 2 days showed complete inhibition of the growth of said *M. pyogenes aureus* on each plate containing the copper salt, whereas extensive growth of said organism was noted on the "blank" plates.

In preparing the present ether-esters, generally equimolar quantities of the ether and the ketonic ester may be employed, since the reaction is one of simple addition. However, an excess of the more available ether is advantageously employed in order to assure complete utilization of the ketonic ester. In some instances, i. e., when dealing with easily polymerizable compounds, inhibitors of polymerization may be employed, e. g., hydroquinone, pyrogallol, $\beta$-naphthol, di-tert-butylhydroquinone, etc.

Although the heating may be conducted at any elevated temperature, it is advantageous to operate below the decomposition temperature of the reactants and preferably at temperatures of from 100° C. to 300° C. The time of heating varies with the nature of the reactants as well as with the temperatures employed. When employing lower alkyl vinyl ethers with the lower alkyl acylacrylates, wherein the alkyl group has from 1 to 5 carbon atoms, a heating time of from 12 to 36 hours at a temperature of 100° C. to 200° C. is preferred. In recovering the reaction mixture from the autoclave or other apparatus employed, an unreactive diluent, e. g., benzene or hexane, may be used to facilitate recovery of the entire reaction mixture, and such diluent may be separated from the crude reaction mixture during the fractionation. When the final product is a solid under ordinary atmospheric conditions, the solid may be separated from the reaction mixture by crystallization from an unreactive, readily volatilizable solvent.

The olefinic double bond in the present ether-ester derivatives of dihydropyran permits participation of the present compounds in copolymerization and polymerization reactions to give resinous materials of use in the coatings industry. The double bond also facilitates introduction of other substituents into the pyran ring structure. The present dihydropyrans are likewise readily halogenated and hydrogenated, the halogenation occurring first by addition to the double bond. Subsequent halogenation may replace nuclear hydrogen to give polyhalogenated tetrahydropyran ether-esters.

This invention is a continuation-in-part of my application, Serial No. 257,951, filed November 23, 1951, now abandoned.

What is claimed is:

1. The process which comprises heating, at a temperature of from 100° C. to 300° C. a keto-ester having the formula $RCOCR^I:CR^{II}.COOR^{III}$ in which $R^I$ and $R^{II}$ are selected from the class consisting of hydrogen and the methyl radical and R and $R^{III}$ are selected from the class consisting of alkyl and aryl radicals of from 1 to 10 carbon atoms, with a vinyl ether having the formula CH$_2$:CHOR$^{IV}$ in which R$^{IV}$ is selected from the class consisting of alkyl and aryl radicals of from 1 to 18 carbon atoms, and recovering from the resulting reaction product a dihydropyran compound having the formula

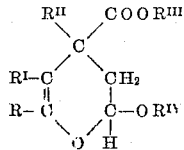

in which R$^I$ and R$^{II}$ are selected from the class consisting of hydrogen and the methyl radical and R, R$^{III}$ and R$^{IV}$ are selected from the class consisting of alkyl and aryl radicals of from 1 to 18 carbon atoms.

2. The process which comprises heating methyl β-acetylacrylate with ethyl vinyl ether at a temperature of from 100° C to 300° C. and recovering methyl 2-ethoxy-6-methyl-3,4-dihydro-1,2-pyran-4-carboxylate from the resulting reaction product.

3. The process which comprises heating methyl β-benzoylacrylate with ethyl vinyl ether at a temperature of from 100° C. to 300° C. and recovering methyl 2-ethoxy-6-phenyl-3,4-dihydro-1,2-pyran-4-carboxylate from the resulting reaction product.

References Cited in the file of this patent
UNITED STATES PATENTS

| | | |
|---|---|---|
| 2,514,168 | Smith et al. | July 4, 1950 |
| 2,658,081 | Emerson et al. | Nov. 3, 1953 |

OTHER REFERENCES

Schulz et al.: Angewandte Chemie, vol. 62 (1950), pp. 109–113.